July 20, 1965     J. L. HOLLIS     3,196,066
TIRE MACHINE

Filed March 13, 1963     4 Sheets-Sheet 1

July 20, 1965           J. L. HOLLIS           3,196,066

TIRE MACHINE

Filed March 13, 1963           4 Sheets-Sheet 2

July 20, 1965  J. L. HOLLIS  3,196,066
TIRE MACHINE
Filed March 13, 1963  4 Sheets-Sheet 4

3,196,066
TIRE MACHINE
Jack L. Hollis, Cuyahoga Falls, Ohio, assignor to The Firestone Tire & Rubber Company, Akron, Ohio, a corporation of Ohio
Filed Mar. 13, 1963, Ser. No. 264,835
4 Claims. (Cl. 156—405)

This invention relates to a stock transfer apparatus and more particularly to a server for supplying tire tread stock to a tire building drum.

In building pneumatic tires, especially larger sizes such as tractor tires, supplying the tread stock to the building drum has been a longstanding problem. Because it is not unusual for such a tread to run over 10 feet in length, and to weigh over 200 pounds, proper handling is difficult without stretching or deforming the tread, or getting it soiled.

The present invention solves the aforementioned difficulties by providing a tire tread server which is adapted to reciprocate between a tread loading station and a tread unloading station, such as a tire building drum.

The server of the invention comprises a carriage mounting two roller conveyors in superimposed relationship, a part of the tread weight being supported by a first, upper conveyor, and the remaining weight being supported by a second, lower conveyor.

The upper conveyor is pivoted to allow loading of the tread onto the conveyor and is provided with guide means to deliver the tread accurately to the tire building drum, after the server has moved to its station along guide rails. The upper conveyor is further provided with means to adjust its positions for cooperation of the device with drums of different diameters or sizes.

It is, therefore, an object of this invention to provide a novel stock server.

Another object of the present invention is to provide a server which will accommodate tire tread stock of exceptional length and weight and deliver the stock to a tire building drum.

Another object is to provide a server which will accommodate tire tread stock with a minimum of manual handling.

A further object is to provide a server which will reduce distortion and stretching of tire tread stock during handling.

Yet another object is to provide a server which will accurately align the tread stock it supplies to the tire building drum.

These and other objects will become more apparent by reference to the following specification and drawings, in which.

Figure 1:
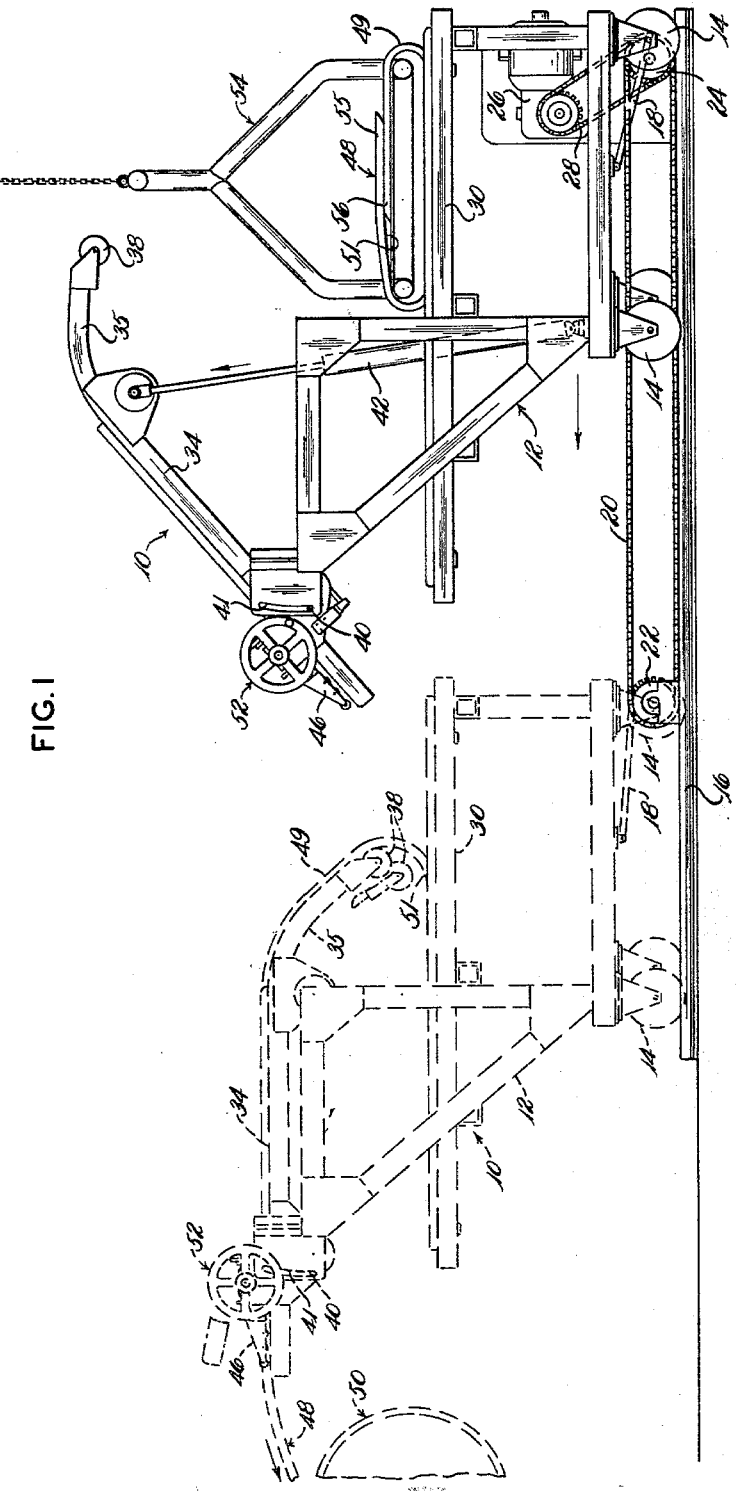
FIGURE 1 is a side elevation of the server of the invention, the server being shown in the loading position in solid lines, and in the unloading, or serving, position in dotted lines.

Referring to the drawings, the tire tread server is generally indicated at 10. The server 10 comprises a carriage 12 supported for motion by wheels 14 on rails 16. Reciprocal movement may be imparted to the server 10 through a link 18 connected at one end to carriage 12 and at the other end to an endless chain 20 operating between fixed sprockets 22 and 24. A drive motor 26 is connected to sprocket 24 by chain 28.

The carriage 12 comprises a lower conveyor unit 30 having idler rollers 32, and an upper conveyor unit 34 having idler rollers 36. One end of conveyor 34 is curved as at 35 and terminates in enlarged end roller 38.

Figure 5:
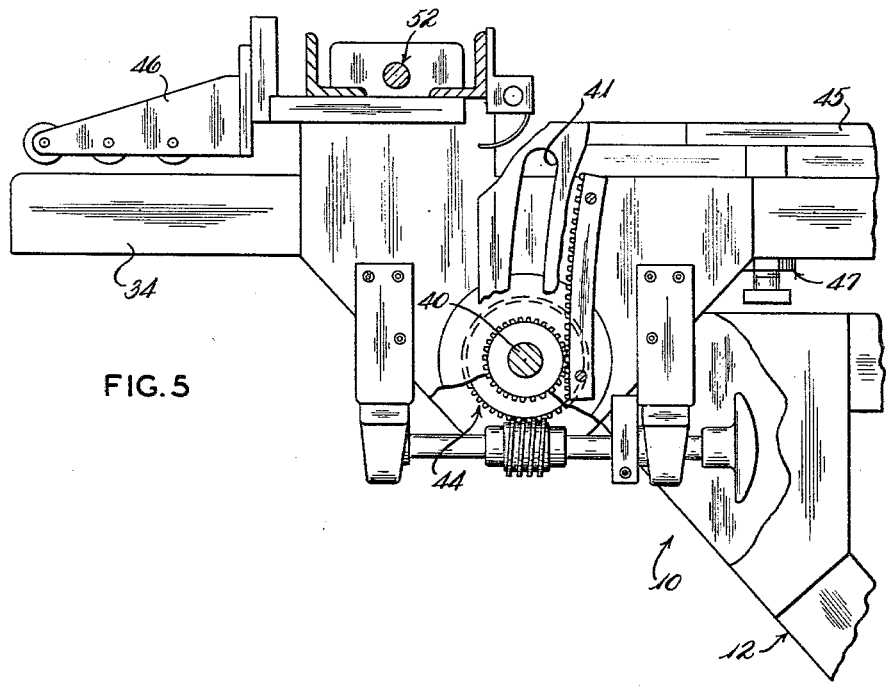
FIGURE 5 is an enlarged fragmentary view, partly broken away, of the upper conveyor pivot adjustment.

Conveyor 30 is stationary with respect to the carriage 12, preferably being fixed thereon; while, conveyor 34 is pivotally mounted as at 40 and may be raised and lowered by means of cylinders 42. Pivot 40 is movable along a slot 41, by a rack and pinion arrangement 44 (FIGURE 5), to adjust the upper conveyor 34, as shown in dot-dash lines in FIGURE 1, to different heights for the accommodation of different building drum sizes.

The upper conveyor 34 is further provided with two pairs of guides, 45 and 46, for aligning a tread 48 while it is being applied to the tire building drum 50. Guides 45 align the edges E of the tread and are adjustable by nut and slot arrangements 47; the guides 46 align the tread shoulders S, and are adjustably spaced by a handwheel and screw arrangement 52.

Figure 2:
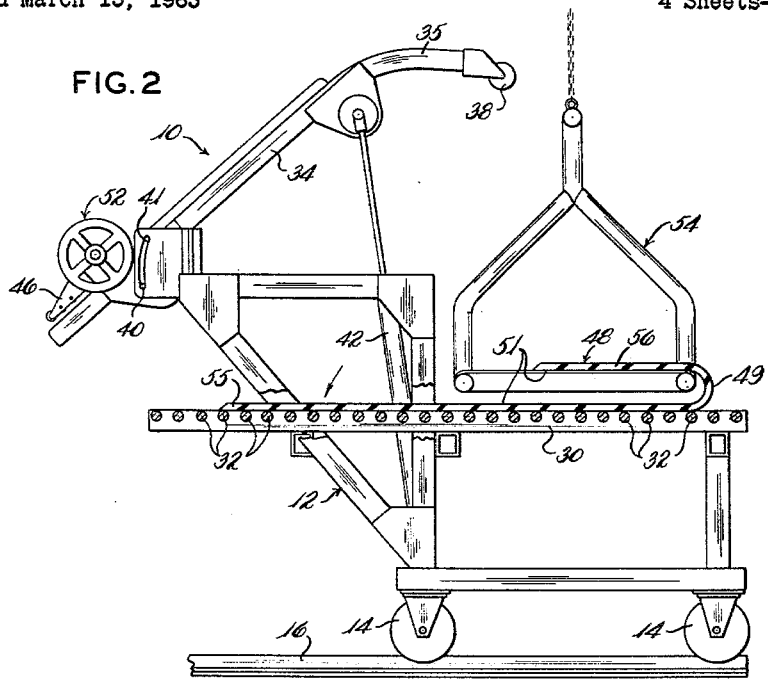
FIGURES 2 and 3 are sequential views showing the loading of tread stock into the server.
Figure 3:
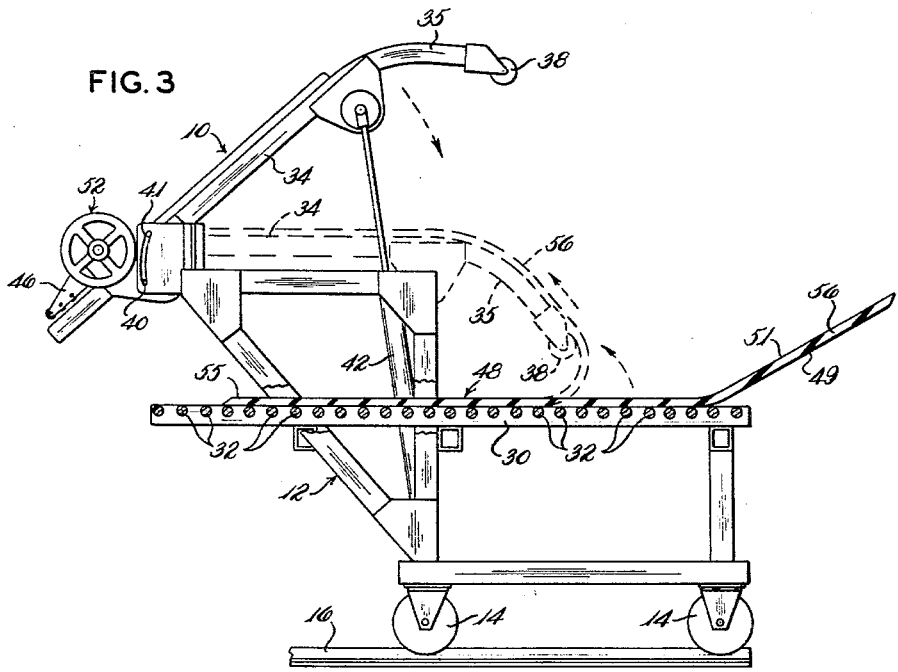
Figure 4:
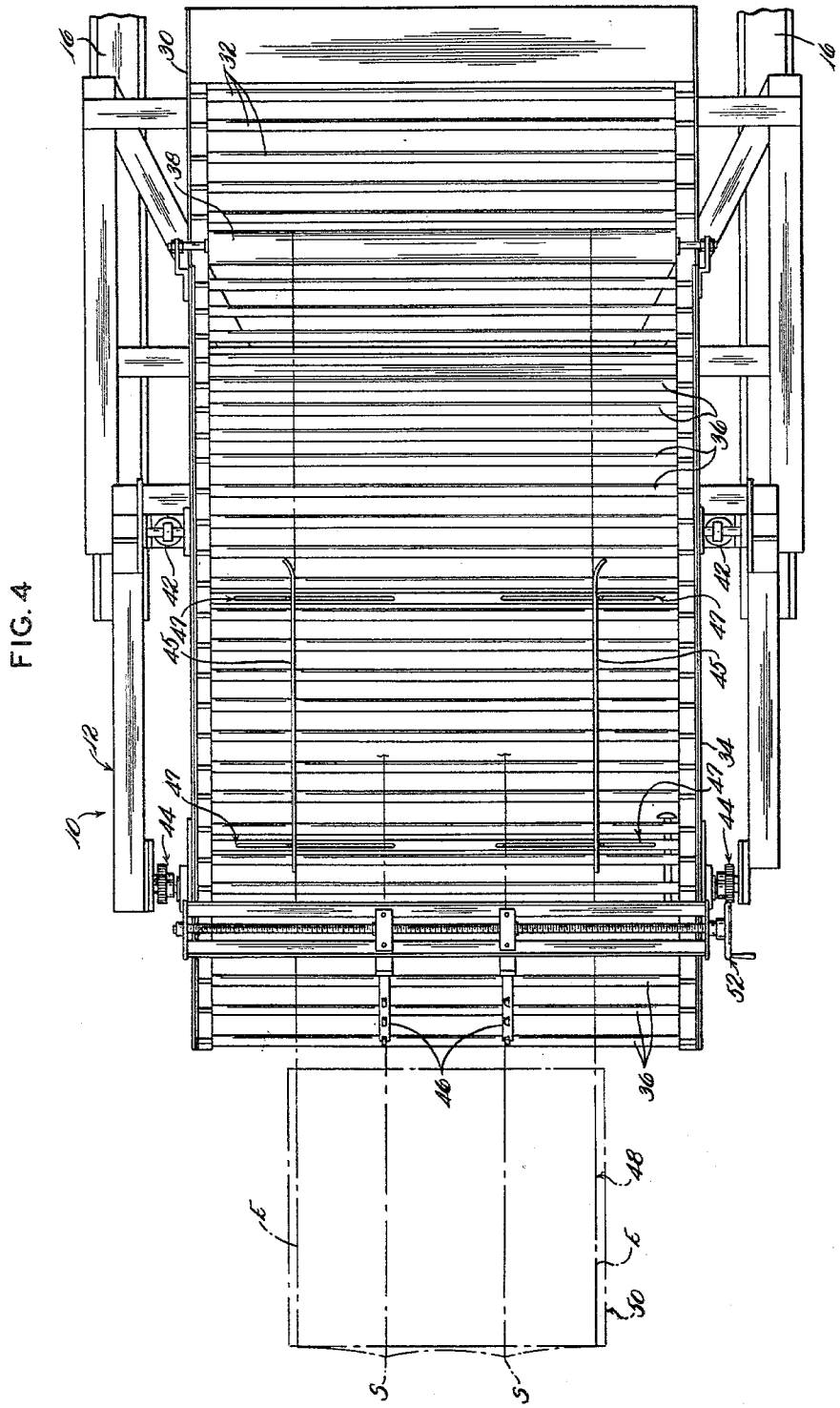
FIGURE 4 is a top plan view of the server of the invention.

In operation, a tread 48 looped about chain hoist hook 54 is brought into position and is placed on the lower conveyor 30, as shown in FIGURE 1 in solid lines. The rearward end 55 of the tread 48 is next unfolded and laid on conveyor 30, as shown in FIGURE 2. The forward end 56 is then unfolded, as shown in FIGURE 3, and the hook member 54 is removed.

The upper conveyor 34 is then lowered by means of cylinders 42 to bring its curved portion 35 close to conveyor 30. The forward end 56 of the tread is placed over rollers 38 onto the upper conveyor 34, as shown in dotted lines in FIGURE 3. The tread edges E and the tread shoulders S are thereafter located between guides 45 and 46, respectively.

The server 10 is next moved by motor 26 and the attendant drive to the dotted line position of FIGURE 1, where the tread 48 is transferred, forward end 56 first, to the building drum 50.

It will be noted that tread 48, as it arrives on the hoist hook 54, is folded in such a manner that the surface or face 49 which will form the road-contacting portion, lies on the outside of the loop, thus protecting the inner carcass-contacting surface, or face 51, against contamination. After the hoist has been removed, it may thus be said that the tread lies "on its back" as it is shown in FIGURE 3. When the forward end 56 of the tread is folded over the curved end 35 of the upper conveyor 34, the tread becomes inverted, and is moved toward the building drum 50 with its road-contacting surface uppermost.

After application of the tread to the building drum, the carriage is again backed away to the full-line position of FIGURE 1, the cylinders 42 are activated, swinging upper conveyor 34 up and away from lower conveyor 30 (as shown in FIGURE 2), giving access to the hoist hook of tread carrier 54.

The invention thus provides a novel, simplified space-saving, economical and easily serviceable tread server, capable of operation by a single operator without regard for the length or weight of cumbersome tire treads. By the fold-over method disclosed, a minimum amount of manual labor is required; stretching, distortion and tread contamination are minimized, and long and heavy treads are handled in a minimum space.

While a preferred form of the invention has been shown and described, various modifications will occur to those skilled in the art without departing from the scope of the invention as defined in the appended claims.

What is claimed is:

1. A server for supplying a stock member to a feed position at a tire-building drum, said server comprising a carriage, first conveyor means on said carriage adapted to support one end of a stock member for motion away from the feed position; and second conveyor means adapted to support the other end of the same said stock member for motion toward the feed position and pivot means on said second conveyor means to reverse the direction of motion of said stock member.

2. A server as in claim 1, wherein said server comprises means for reciprocating said carriage between a stock loading station and a tire building drum.

3. A server as in claim 1, wherein said second conveyor comprises a curved end supporting said pivot means.

4. A server for supplying a stock member to a feed position at a tire-building drum, said server comprising a carriage, means to reciprocate said carriage from a stock loading station to a tire building drum, a first conveyor on said carriage having rollers thereon to support one end of a stock member by one face thereof for motion away from the feed position, a second conveyor on said carriage spaced above said first conveyor and having rollers thereon to support the other, inverted end of the same said stock member by the opposite face thereof for motion toward the feed position, a first pivot on said second conveyor to reverse the direction of motion of said stock member, a second pivot for said second conveyor, means to adjust the location of said second pivot, means to rotate said second conveyor in a vertical plane about said second pivot, and adjustable guide means on said second conveyor for aligning the shoulders of said stock member with respect to the drum.

References Cited by the Examiner

UNITED STATES PATENTS

| | | | |
|---|---|---|---|
| 1,524,067 | 1/25 | Troutman | 214—152 |
| 1,554,871 | 9/25 | Melvin et al. | 156—405 |
| 2,041,990 | 5/36 | Breth | 156—405 |
| 2,346,439 | 4/44 | Leguillon | 156—405 |
| 2,473,067 | 6/49 | Miller | 156—405 X |
| 2,521,728 | 9/50 | Kastner | 156—403 X |
| 2,588,207 | 3/52 | Cleland et al. | 156—126 |
| 2,981,309 | 4/61 | Loges | 156—405 |
| 3,017,312 | 1/62 | Kraft | 156—406 |
| 3,038,524 | 6/62 | Bosomworth | 156—405 |
| 3,062,270 | 11/62 | Riddle | 156—405 |
| 3,062,388 | 11/62 | Hunter | 214—1 |
| 3,071,179 | 1/63 | Tourtelotte et al. | 156—405 |
| 3,088,612 | 5/63 | Aluise | 214—152 |
| 3,114,463 | 12/63 | Fouron | 214—1 |

EARL M. BERGERT, *Primary Examiner.*

H. SCHULZ, *Examiner.*